(12) United States Patent
Yamaguchi et al.

(10) Patent No.: US 8,889,987 B2
(45) Date of Patent: Nov. 18, 2014

(54) WIRE HARNESS ASSEMBLY WITH ROD MEMBER

(75) Inventors: Atsuyoshi Yamaguchi, Kosai (JP); Kunihiko Satou, Kosai (JP)

(73) Assignee: Yazaki Corporation, Tokyo (JP)

( * ) Notice: Subject to any disclaimer, the term of this patent is extended or adjusted under 35 U.S.C. 154(b) by 201 days.

(21) Appl. No.: 12/788,633

(22) Filed: May 27, 2010

(65) Prior Publication Data

US 2010/0307819 A1      Dec. 9, 2010

(30) Foreign Application Priority Data

Jun. 3, 2009   (JP) .................................. 2009-133769

(51) Int. Cl.
| | |
|---|---|
| *H02G 3/04* | (2006.01) |
| *H01B 7/06* | (2006.01) |
| *H02G 3/00* | (2006.01) |
| *H01B 7/00* | (2006.01) |
| *H02B 1/20* | (2006.01) |
| *H02G 11/00* | (2006.01) |
| *B60R 16/02* | (2006.01) |

(52) U.S. Cl.
CPC ............ *H02G 11/00* (2013.01); *B60R 16/0215* (2013.01); *H02G 3/0481* (2013.01)
USPC ........ 174/72 A; 174/69; 174/70 R; 174/72 C; 174/135; 361/826

(58) Field of Classification Search
USPC ............. 174/69, 70 R, 72 A, 72 C, 68.1, 135; 361/826
See application file for complete search history.

(56) References Cited

U.S. PATENT DOCUMENTS

| | | | | |
|---|---|---|---|---|
| 5,957,702 | A  * | 9/1999 | Nagai et al. ..................... | 439/34 |
| 6,161,894 | A  * | 12/2000 | Chapman ....................... | 296/155 |
| 6,217,375 | B1 * | 4/2001 | Nagai et al. .................... | 439/501 |
| 6,281,441 | B1 * | 8/2001 | Van Mill et al. ................ | 174/69 |
| 6,417,451 | B1 * | 7/2002 | Uchiyama ................... | 174/72 A |
| 6,492,592 | B1 | 12/2002 | Murofushi et al. | |
| 6,603,076 | B2 | 8/2003 | Doshita et al. | |

(Continued)

FOREIGN PATENT DOCUMENTS

| | | |
|---|---|---|
| DE | 10000930 A1 | 7/2000 |
| EP | 1829751 A1 | 9/2007 |

(Continued)

OTHER PUBLICATIONS

Extended European Search Report issued in Application No. 10163860.9, dated Nov. 10, 2010.

(Continued)

*Primary Examiner* — Timothy Thompson
*Assistant Examiner* — Sherman Ng
(74) *Attorney, Agent, or Firm* — Sughrue Mion, PLLC

(57) ABSTRACT

A wire harness assembly includes an electric wire including: a fixed-side connecting portion to be fixed to a fixed structure; a movable-side connecting portion to be fixed to a movable structure which is movable with respect to the fixed structure; and an extension portion extended and flexed from the fixed-side connecting portion to the movable-side connecting portion in a substantially U-shape or arc shape, and having an extra length for allowing the movement of the movable structure. The wire harness assembly also includes an elastic rod member which is provided along the extension portion of the electric wire.

8 Claims, 9 Drawing Sheets

(56) References Cited

U.S. PATENT DOCUMENTS

| | | |
|---|---|---|
| 7,252,541 B2 | 8/2007 | Tsubaki et al. |
| 7,341,478 B2 | 3/2008 | Tsubaki et al. |
| 7,381,898 B2 | 6/2008 | Ide |
| 2001/0004022 A1* | 6/2001 | Kobayashi .................. 174/72 A |
| 2001/0052203 A1 | 12/2001 | Doshita et al. |
| 2002/0014348 A1* | 2/2002 | Aoki et al. .................. 174/72 A |
| 2002/0129962 A1* | 9/2002 | Doshita et al. .............. 174/72 A |
| 2005/0241847 A1* | 11/2005 | Robinson et al. ........... 174/72 A |
| 2006/0056165 A1* | 3/2006 | Tsunoda et al. .............. 361/826 |
| 2006/0278423 A1* | 12/2006 | Ichikawa et al. ............ 174/72 A |
| 2007/0148994 A1* | 6/2007 | Sato et al. ...................... 439/34 |
| 2010/0193216 A1 | 8/2010 | Ushiyama et al. |

FOREIGN PATENT DOCUMENTS

| | | |
|---|---|---|
| JP | 61-139213 A | 6/1986 |
| JP | 2000-255341 A | 9/2000 |
| JP | 2001-359232 A | 12/2001 |
| JP | 2006-074980 A | 3/2006 |
| JP | 2008-048523 A | 2/2008 |
| JP | 2008195182 A | 8/2008 |
| WO | 2009-016953 A1 | 2/2009 |

OTHER PUBLICATIONS

Office action issued by the Japanese Patent Office dated Aug. 20, 2013 in counterpart Application No. 2009-133769.

* cited by examiner

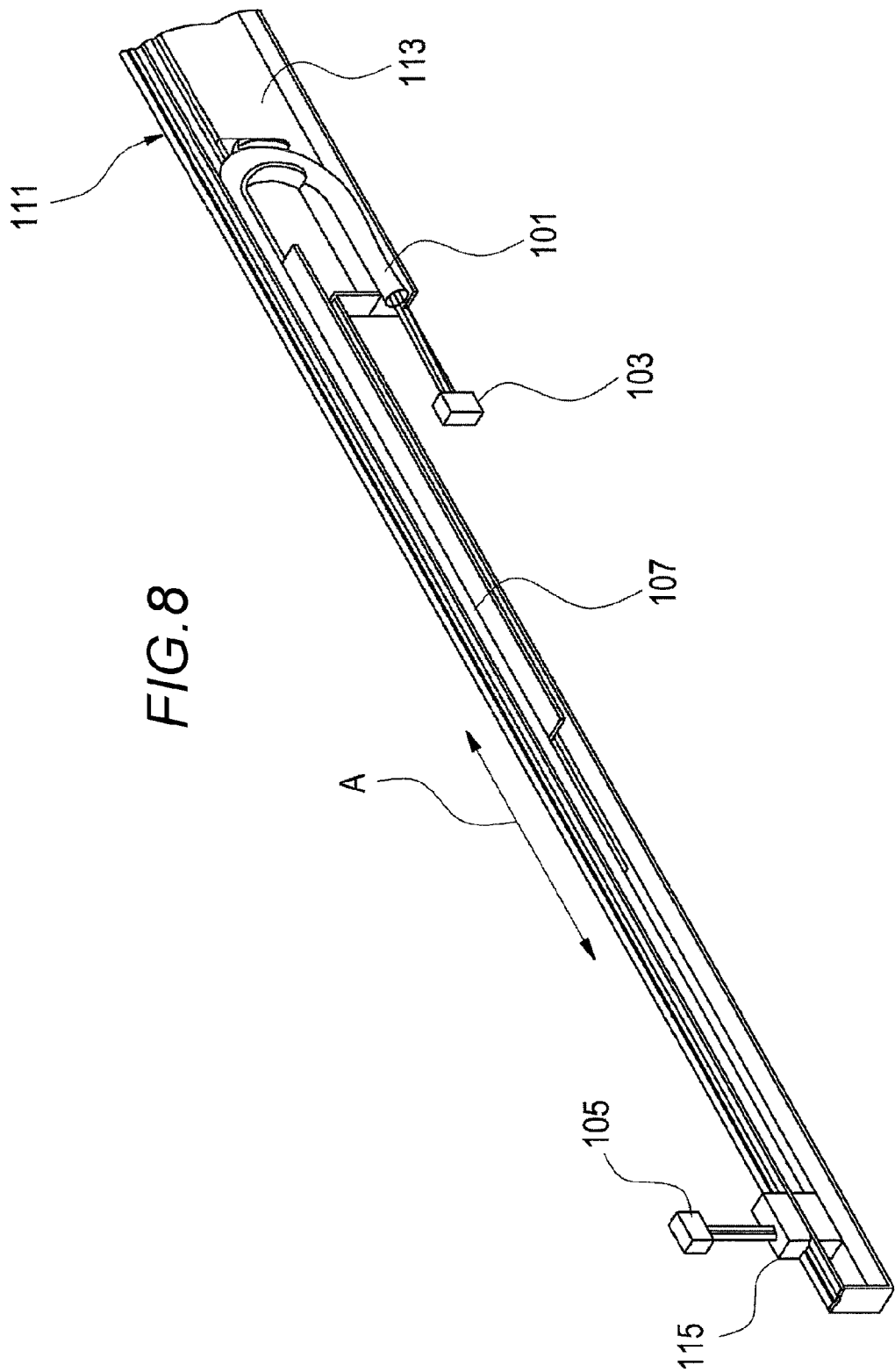

WIRE HARNESS ASSEMBLY WITH ROD MEMBER

BACKGROUND OF THE INVENTION

1. Technical Field

The present invention relates to a wire harness assembly in which a wire harness extends between a movable structure such as a sliding door or a tailgate of a motor vehicle and a fixed structure on which the movable structure is mounted movably for feeding an electric part on the movable structure.

2. Background Art

In wire harnesses routed in a motor vehicle, for example, a wire harness for feeding an electric part on a movable structure such as a sliding door or a tailgate is routed to extend between the movable structure and a fixed structure such as a body frame on which the movable structure is movably mounted.

FIGS. 8 and 9 show conventional examples of such a wire harness routing structure.

A routing structure shown in FIG. 8 is disclosed in JP-A-2006-74980. A wire harness 101 that is to be routed is configured, for example, so that an extra length is imparted to an extension portion 107 between a fixed-side connecting portion 103 which is fixed to a fixed-side structure such as a body panel or a body frame and a movable-side connecting portion which is fixed to a movable structure such as a sliding door so as to permit a movement of the movable structure. The extension portion 107 is accommodated in a wire harness accommodation space 113 underneath a guide rail 111 in such a state that the extension portion 107 is deflected into a substantially U-shape. Thus, an abnormal displacement of the extension portion 107 is restricted which would otherwise occur in association with movement of the movable structure, and an interference of the extension portion 107 with a peripheral structure is prevented.

The guide rail 111 has a slider 115 which slides to move along moving directions (in FIG. 8, directions indicated by arrows A) of the movable structure, not shown. A part of the extension portion 107 which is accommodated in the harness accommodation space 113 and provided at the movable-side connecting portion 105 is connected to the slider 115.

The slider 115 is connected to the movable structure and moves along the guide rail in connection with the movement of the movable structure.

In the case of a routing structure shown in FIG. 9, an extension portion 107 is provided between a fixed-side connecting portion 103 and a movable-side connecting portion 105 of a wire harness that is to be routed. This extension portion 107 is wound into a wire harness accommodation box 121 for accommodation therein while being allowed to be unwound therefrom. Therefore, an abnormal displacement of the extension portion 107 is restricted which would otherwise occur in association with movement of the movable structure, and an interference of the extension portion 107 with a peripheral structure is prevented.

The wire harness accommodation box 121 has a reel which is provided rotatably within a box main body 123 for winding the extension portion 107 thereround and a bias part such as a spring for biasing the reel in a winding direction. An unwinding length of the extension portion 107 from the box main body 123 is controlled by the reel rotating in accordance with a moving amount of the movable structure.

However, since either of the conventional routing structures shown in FIGS. 8 and 9 has the guide rail 111 or the wire harness accommodation box 121 which accommodates the extension portion 107 therein, the number of constituent parts is increased largely. In addition, since the guide rail 111 and the wire harness accommodation box 121 have the complex structures, the production costs of systems which adopt these routing structures are increased.

In addition, due to the configuration in which the guide rail 111 and the wire harness accommodation box 121 surround their corresponding extension portion 107, the routing space is increased. Thus, conservation of space is made difficult.

Further, when the wire harness 101 is loosened as required in an attempt to allow it to follow the movable-side connecting portion 105, a peripheral space has to be taken more than necessary.

SUMMARY OF THE INVENTION

The invention has been made with a view to solving the problems and an object thereof is to provide a wire harness assembly having a routing structure which can realize a reduction in the number of parts to be used in routing a wire harness and a simplification of structures of parts to be used and which can enable a smooth movement of the wire harness.

A wire harness assembly according to the present invention includes an electric wire including: a fixed-side connecting portion to be fixed to a fixed structure; a movable-side connecting portion to be fixed to a movable structure which is movable with respect to the fixed structure; and an extension portion extended and flexed from the fixed-side connecting portion to the movable-side connecting portion in a substantially U-shape or arc shape, and having an extra length for allowing the movement of the movable structure. The wire harness assembly also includes an elastic rod member which is provided along the extension portion of the electric wire.

According to the configuration described above, an abnormal displacement such as flapping of the extension portion of electric wire of the wire harness which occurs in association with movement of the movable structure is restricted by the action of rigidity and elastic force of the rod member provided along the extension portion.

The wire harness assembly may be configured in that the rod member is made of a metallic material having a corrosion resistance.

According to the configuration described above, since the rod member has corrosion resistance, the rusting of the rod member can be reduced which would otherwise be produced by water, oil or dust.

The wire harness assembly may be configured in that the rod member has rigidity larger than that of the electric wire.

According to the configuration described above, the abnormal displacement of the extension portion is restricted by the action of large rigidity of the rod member provided along the extension portion.

The wire harness assembly may be configured in that the rod member includes metallic wires twisted with each other.

According to the configuration described above, even though part of the twisted metallic wires happens to be cut as a result of occurrence of an expected event, the extension portion is controlled by the elasticity of the remaining metallic wires to thereby increase the safety and reliability of the wire harness.

The wire harness assembly may be configured in that the twisted wires are coated with a resin material.

According to the configuration described above, since the metallic wires are coated with the resin material, there is no need to apply any specific rust preventive treatment to the metallic wires.

According to the wire harness assembly having a wire harness routing structure of the invention, since the part to restrict the abnormal displacement of the extension portion is the rod member provided along the extension portion, compared with the conventional wire harness routing structure which utilizes the guide rail and the harness accommodation box to restrict the abnormal displacement of the extension portion, the number of parts to be used can be reduced largely, and at the same time, the structures of the parts used can be simplified, thereby making it possible to reduce the production costs of a system which adopts the wire harness routing structure of the invention.

BRIEF DESCRIPTION OF THE DRAWINGS

In the accompanying drawings:

FIGS. 5A and 5B show a thin rod member according to a first embodiment of the invention, wherein FIG. 5A is a partially cutaway enlarged perspective view of the rod member which shows how electric wires are provided along the rod member; and FIG. 5B is an enlarged sectional view showing the structure of the rod member;

FIGS. 6A and 6B show a thin rod member according to a second embodiment of the invention, wherein FIG. 6A is a partially cutaway enlarged perspective view of the rod member which shows how electric wires are provided along the rod member; and FIG. 6B is an enlarged sectional view showing the structure of the rod member;

FIGS. 7A and 7B show a thin rod member according to a third embodiment of the invention, wherein FIG. 7A is a partially cutaway enlarged perspective view of the rod member which shows how electric wires are provided along the rod member; and FIG. 7B is an enlarged sectional view showing the structure of the rod member;

FIG. 8 is a perspective view showing an example of a conventional wire harness routing structure.

DETAILED DESCRIPTION OF THE EXEMPLARY EMBODIMENTS

Hereinafter, exemplary embodiments of a wire harness assembly having a wire harness routing structure according to the invention will be described in detail by reference to the drawings.

Figure 1:
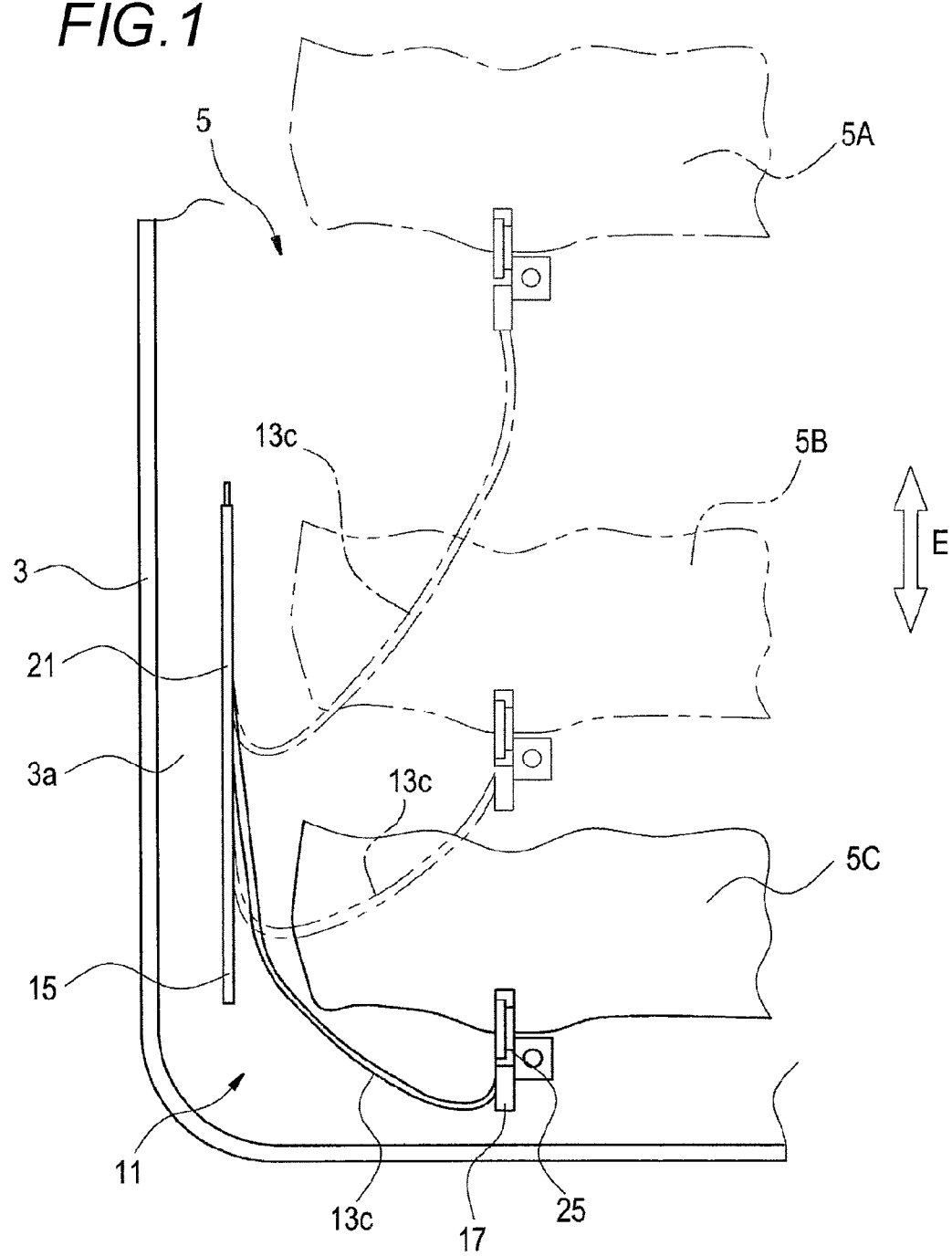
FIG. 1 is an explanatory diagram showing a state where an extension portion of a wire harness moves in association with movement of a movable structure according to embodiments of the invention.

A rear door 3 shown in FIG. 1 is equipped with a windowpane 5 which is adapted to ascend and descend in vertical directions (directions indicated by arrows E in FIG. 1). An electric part such as defogging electric wires, not shown, is provided on the windowpane 5.

Figure 3:
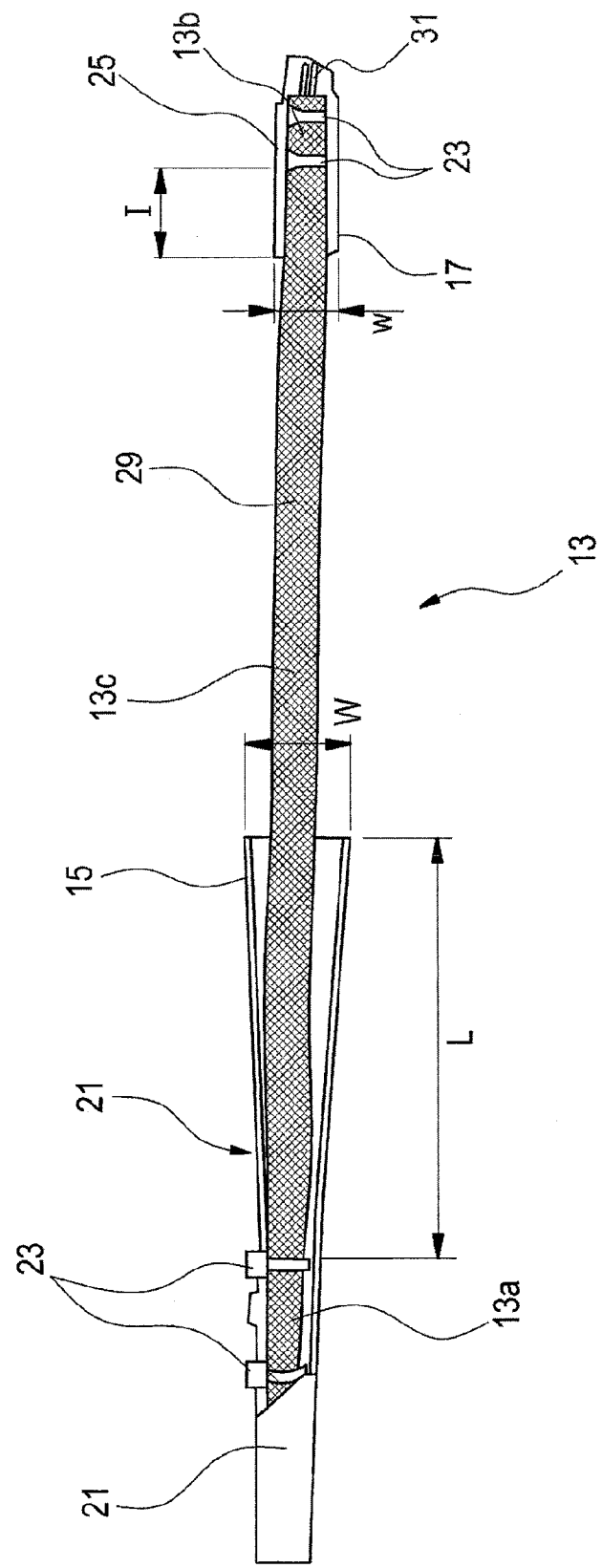
FIG. 3 is a plan view showing the configuration of a wire harness assembly.
Figure 4:
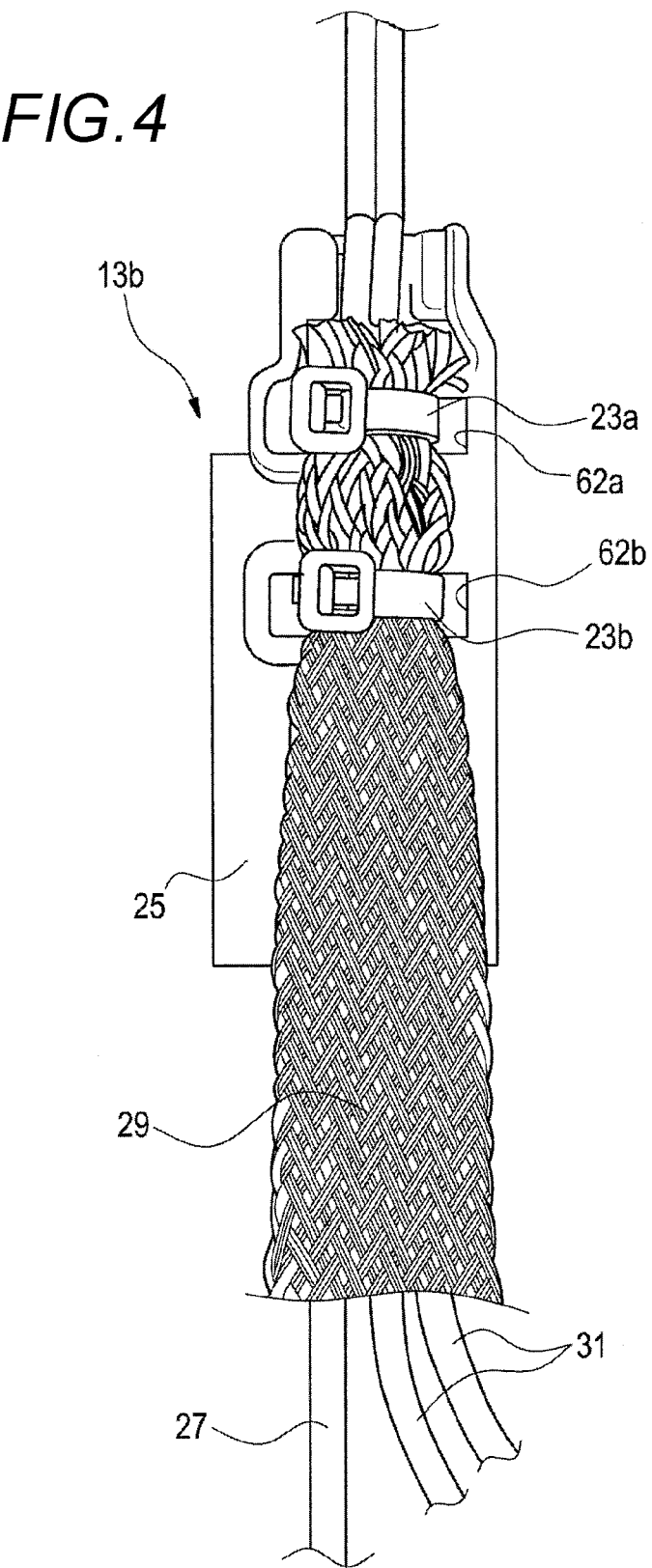
FIG. 4 is a plan view showing the configuration of a movable-side connector.
Figure 5A:
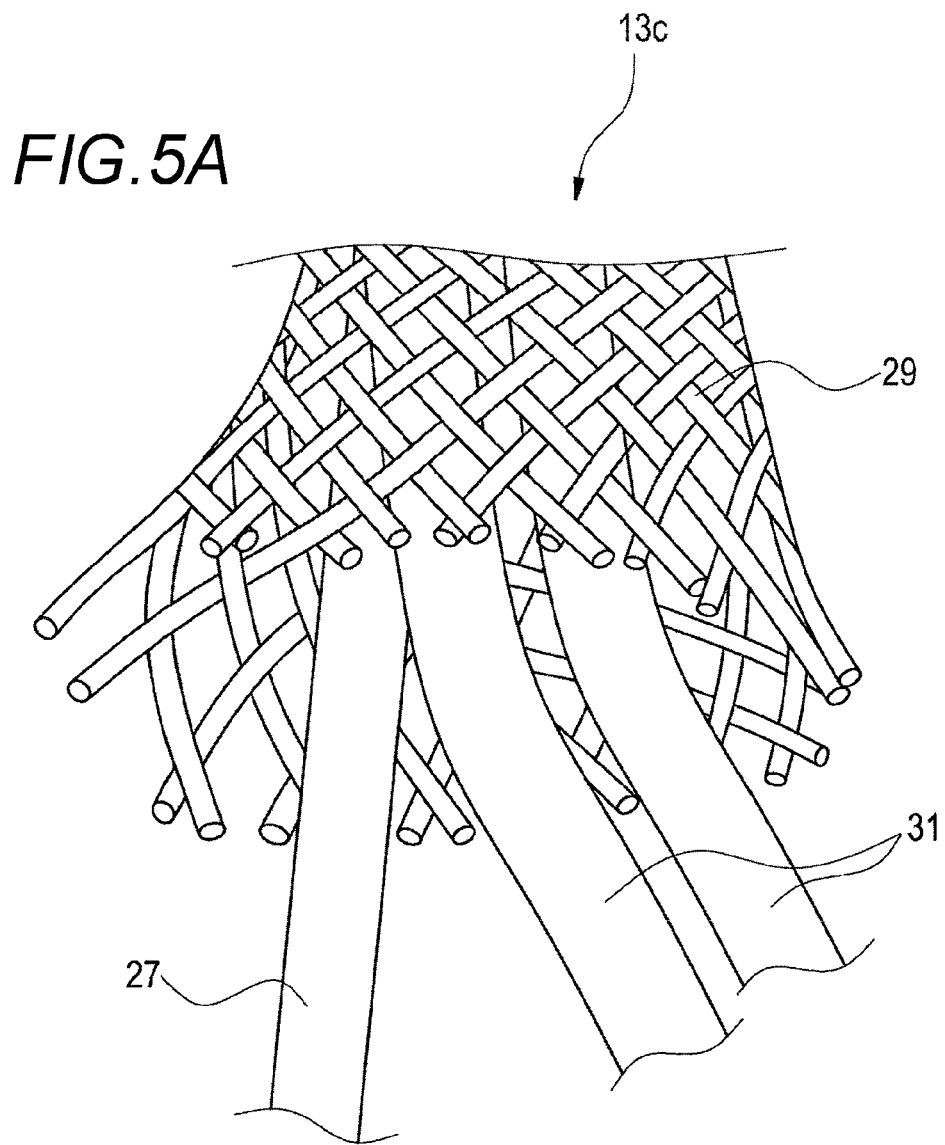
Figure 5B:
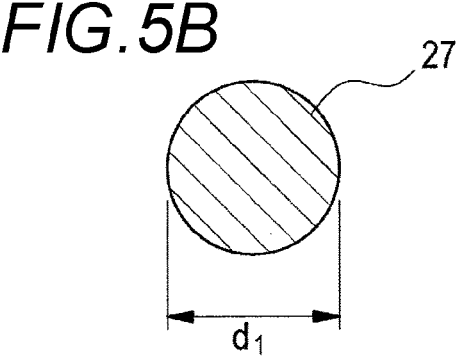

A wire harness routing structure 11 according to embodiments of the invention is intended to route a wire harness assembly 13 shown in FIG. 3 so as to extend between a door panel 3a of the rear door 3 which corresponds to a fixed structure and the windowpane 5 which corresponds to a movable structure equipped movably on the door panel 3a for feeding the electric part on the windowpane 5.

The windowpane 5 is mounted in the door panel 3a so as to be caused to ascend and descend in the directions indicated by the arrows E in FIG. 1 by a lifting mechanism, not shown. In FIG. 1, reference numeral 5A denotes the windowpane which has moved to its upper limit position, reference numeral 5B denotes the windowpane which has moved to its intermediate position where the window is half opened, and reference numeral 5C denotes the windowpane which has moved to its lower limit position where the window is fully opened.

As is shown in FIG. 1, a curved position of an extension portion 13c of the wire harness assembly 13 which is extended between the door panel 3a and the windowpane 5 shifts in connection with movement (ascending or descending) of the windowpane 5.

A fixed-side protector 21 is fixedly equipped on an inner surface side of the door panel 3a so as to extend along a vertical direction in a position lying to a side of the windowpane 5.

The fixed-side protector 21 is made of a channel type die-cut material, for example, and is mounted so that a groove is oriented to the windowpane 5 side so as to accommodate the wire harness assembly 13 which is suspended from the door panel 3a side when the windowpane 5 descends to thereby control the position of the wire harness assembly 13 which is so suspended.

Figure 2:
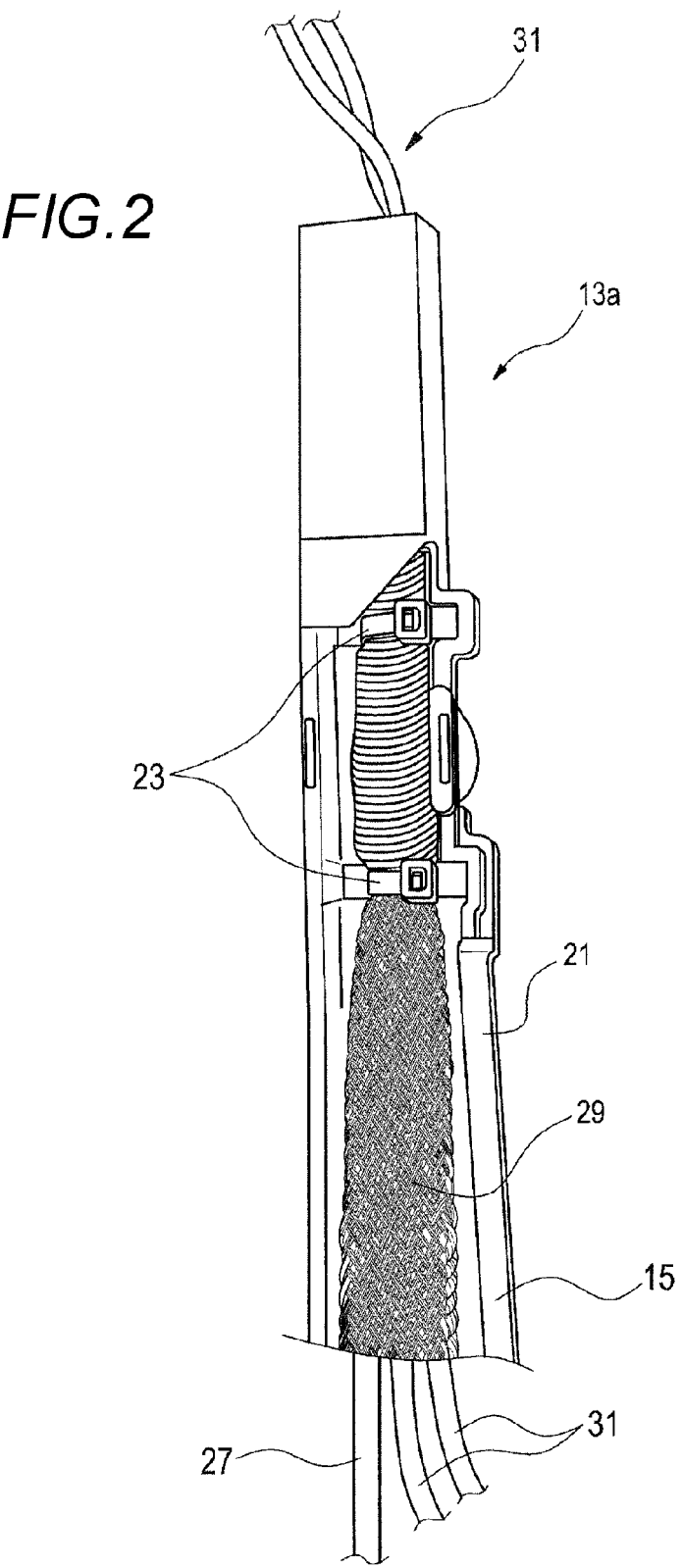
FIG. 2 is a plan view showing the configuration of a fixed-side connector.

The wire harness assembly 13 which is used in the wire harness routing structure 11 includes, as is shown in FIGS. 2 and 3, a fixed-side connecting portion 13a and a movable-side connecting portion 13b. The fixed-side connecting portion 13a is fixed onto the fixed-side protector 21 of the door panel 3a, and corresponds to the fixed side structure. The movable-side connecting portion 13b is fixed onto the windowpane 5 and corresponds to the movable-side structure. In the wire harness assembly 13, an extra length is imparted to the extension portion 13c extending between the fixed-side connecting portion 13a and the movable-side connecting portion 13b. The extra length permits an ascending or descending movement of the windowpane 5.

The fixed-side connecting portion 13a of the wire harness assembly 13 is attached to the fixed-side protector 21 by binding bands 23. The fixed-side protector 21 is fixed on to the door panel 3a by screws which pass through fixing holes, not shown.

In addition, a movable-side protector 25, which functions as a connecting member for fixing the movable-side connecting portion 13b to the windowpane 5, is attached to the movable-side connecting portion 13b by binding bands 23. The movable-side protector 25 is fixed to the windowpane 5 by screws which pass through fixing holes, not show.

(First Embodiment)

According to a first embodiment, in the wire harness assembly 13, the extension portion 13c routed (extended) from the fixed-side connecting portion 13a to the movable-side connecting portion 13b is such that, as is shown in FIGS. 2 to 5B, a thin rod member 27 is vertically provided along electric wires 31 which configure the extension portion 13c, and further, a meshed sheathing member 29 is placed thereover.

As a material for the thin rod member 27, a metallic material such as stainless steel having a high corrosion resistance (rust preventive properties) is preferred in anticipation of various environments where the thin rod member is used, including one where water falls on it.

In addition, since it is displaced together with the extension portion 13c, the thin rod member 27 is made of a metal having spring properties.

Further, the thin rod member 27 preferably has rigidity equal to or larger than those of the sheathing member 29 and the electric wire 31.

By the spring properties and rigidity of the thin rod member 27 being set as described above, a path and a bending radius of the extension portion 13c when the windowpane 5 ascends or descends can be controlled, thereby making it possible to realize an increase in flex durability thereof.

As is shown in FIG. 1, the wire harness assembly 13 is routed in such a form that the extension portion 13c is flexed into a substantially U-shape or arc shape and its movement associated with the ascending or descending movement of the window pane 5 is controlled by the single thin rod member 27 vertically provided along the extension portion 13c. Consequently, the rigidity of the thin rod member 27 acts on the wire harness, and therefore, there is no such situation that the wire harness flaps in a width direction. Additionally, a tension is imparted to the wire harness at all times by virtue of the elastic force of the thin rod member 27, and therefore, there is also no such situation that the wire harness flaps in a vertical direction.

The wire harness routing structure 11 constitutes a configuration in which the displacement of the extension portion 13c of the wire harness associated with the movement of the windowpane 5 is controlled by the single thin rod member 27 which is vertically provided along the extension portion 13c. When compared with the conventional wire harness routing structures in which the abnormal displacement of the extension portion is restricted by the guide rail and the wire harness accommodation box, the number of parts can be reduced largely, and the simplification of parts can be realized. Consequently, a reduction in production costs of a system can be realized which adopts the wire harness routing structure of the invention.

In addition, an increase in routing space by the addition of the thin rod member 27 for controlling the displacement of the extension portion 13c can be suppressed to such an extent that an extra space substantially equaling a diameter d1 of the thin rod member 27 is provided on an outside of the path of the extension portion 13c of the wire harness. Thus, a large increase in routing space can be suppressed, thereby making it possible to realize the conservation of space.

In the first embodiment, since the thin rod member 27 is adopted, a distance over which the extension portion 13c moves along the fixed-side protector 21 when the movable-side protector 25 ascends or descends is long. On the other hand, there may be a case in which the thin rod member 27 is twisted when the movable-side protector 25 ascends or descends and the extension portion 13c flexes to be deformed into an arc shape. When the thin rod member 27 is twisted, a force acting in the width direction is exerted on the wire harness assembly 13.

Then, in the first embodiment, as is shown in FIGS. 2 and 3, a wire harness restricting member 15 is provided integrally on the fixed-side protector 21 which has a larger width than the wire harness assembly 13 to thereby restrict a widthwise movement of the wire harness. Note that while the wire harness restricting member 15 is formed into a shape in which its width increases from the fixed-side connecting portion 13a towards a direction in which the electric wires extend, its width W and length L are determined in consideration of the movement of the wire harness assembly 13.

Moreover, as is shown in FIG. 3, a wire harness restricting member 17 is also formed on the movable-side protector 25 so as to lie adjacent to the movable-side connecting portion 13b. As is shown in FIG. 1, however, a distance over which the extension portion 13c moves along the movable-side protector 25 is short.

Then, while a width W of the wire harness restricting member 17 is set wider than the width of the wire harness assembly 13, its length I is set to be shorter.

By providing the wire harness restricting members 15, 17, even though the thin rod member 27 is twisted, the wire harness assembly 13 is allowed to stay within the wire harness restricting members 15, 17, and hence, there is no such situation that the wire harness assembly 13 is twisted further to move thereout.

Consequently, the flapping of the wire harness assembly 13 can be reduced, and not only can an undesirable contact of the wire harness assembly with other members be prevented but also the generation of abnormal noise can be prevented.

Note that the invention is not limited to the configuration in which only the single thin rod member 27 is provided but can be applied to various configurations as will be described in embodiments below.

(Second Embodiment)

Next, referring to FIGS. 6A and 6B, a second embodiment of a thin rod member will be described. The constituent elements except for the thin rod member are the same as those described in the first embodiment, and detailed description is omitted.

Figure 6A:
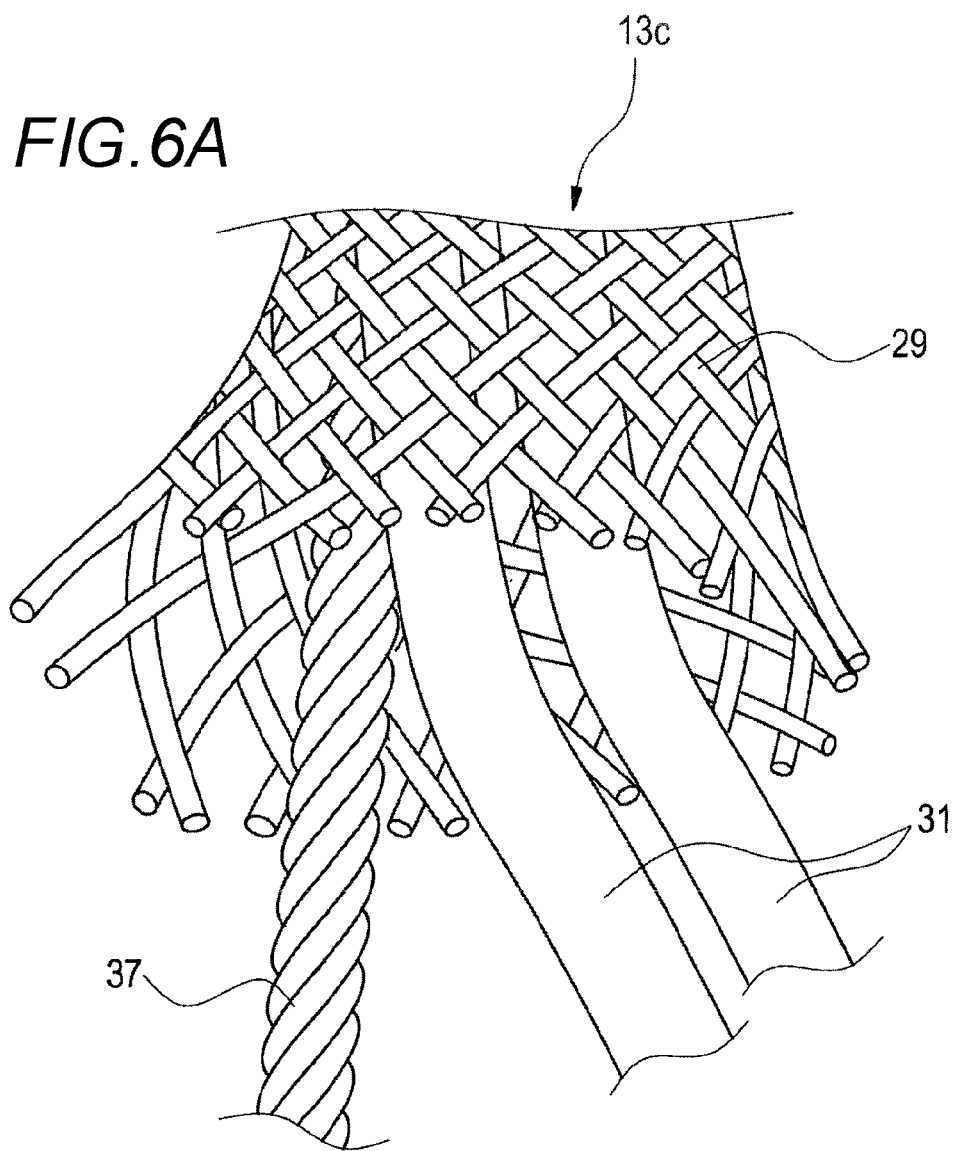
Figure 6B:
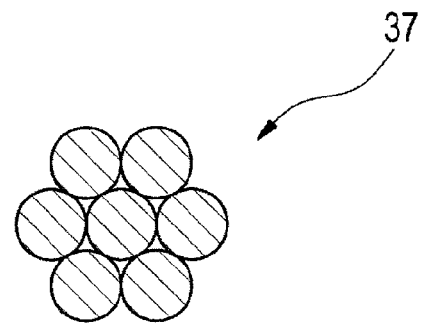

In the second embodiment, twisted metallic wires having spring properties are adopted as a thin rod member 37, as is shown in FIGS. 6A and 6B. Also for the twisted wires of the thin rod member 37, a metallic material such as stainless steel having a high corrosion resistance (rust preventive properties) is adopted in anticipation of various environments where the thin rod member is used, including one where water falls on it.

In addition, since the twisted wires are displaced together with the extension portion 13c, the twisted wires are made of a metal having spring properties.

Further, the thin rod member 37 desirably has rigidity equal to or larger than those of the sheathing member 29 and the electric wire 31.

By the spring properties and rigidity of the thin rod member 37 being set as described above, the path and the bending radius of the extension portion 13c when the windowpane 5 ascends or descends can be controlled, thereby making it possible to realize an increase in flex durability thereof.

(Third Embodiment)

Next, referring to FIG. 7, a third embodiment of a thin rod member will be described. The constituent elements except for the thin rod member are the same as those described in the first embodiment, and detailed description is omitted.

Figure 7A:
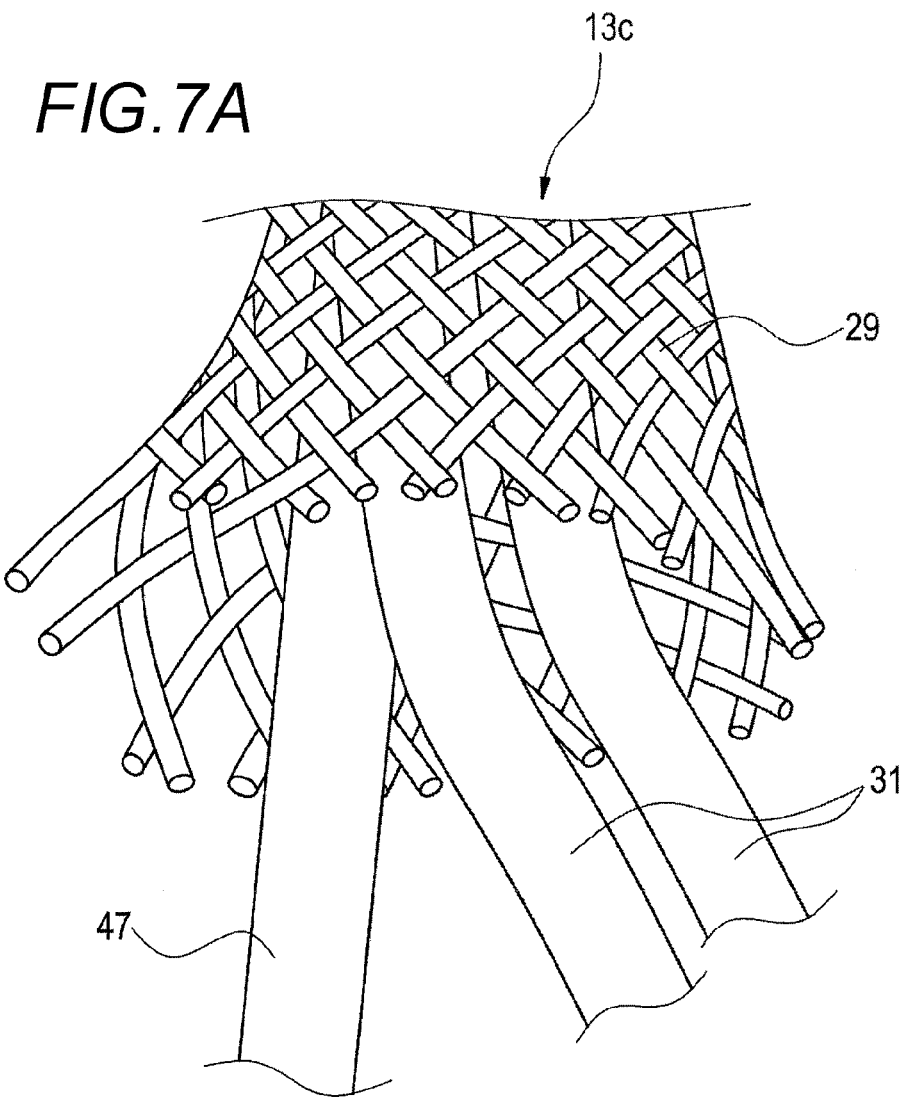
Figure 7B:
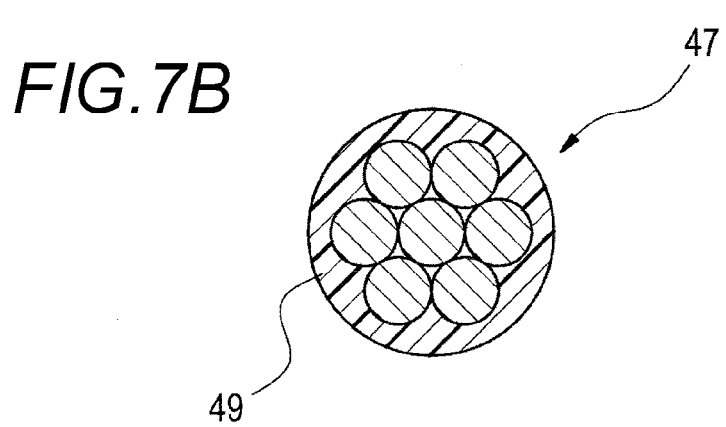
Figure 9:
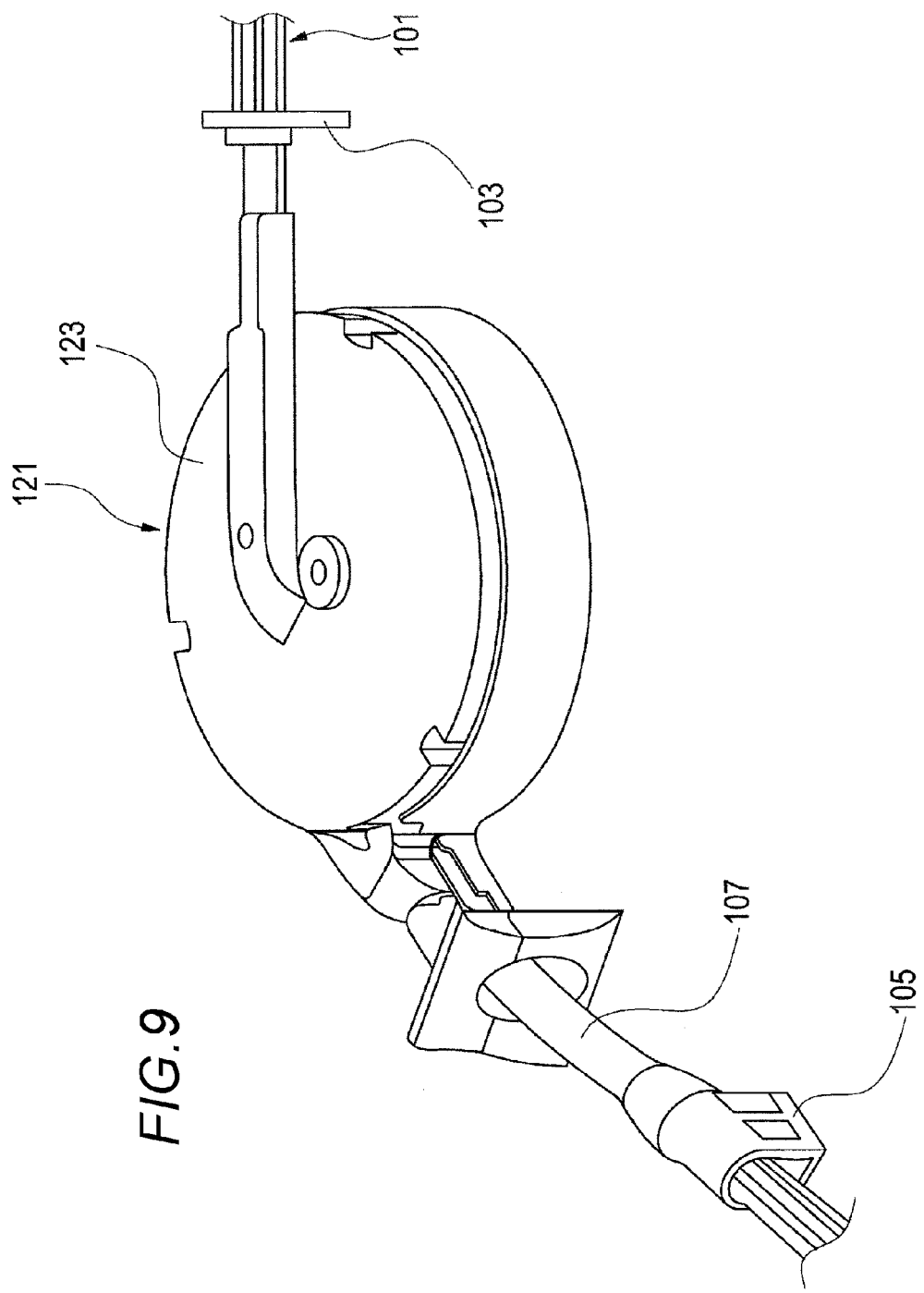
FIG. 9 is a perspective view showing an example of another conventional wire harness routing structure.

In the third embodiment, as a thin rod member 47, twisted metallic wires are adopted which have spring properties and which are coated with a resin material 49, as is shown in FIGS. 7A and 7B. The resin material 49 is coated on the twisted metallic wires so as to increase their corrosion resistance.

In addition, since they are displaced together with the extension portion 13c, the twisted wires are made of a metal having spring properties.

Further, the thin rod member 47 desirably has rigidity equal to or larger than those of the sheathing member 29 and the electric wire 31.

By the spring properties and rigidity of the thin rod member 47 being set as described above, the path and the bending radius of the extension portion 13c when the windowpane 5 ascends or descends can be controlled, thereby making it possible to realize an increase in flex durability thereof.

As described in the respective embodiments, by attaching vertically the thin rod member 27, 37 or 47 to the extension portion 13c, the routing path of the wire harness assembly can be ensured between other parts in proximity to the movable-side protector 25.

In addition, by adopting the thin rod members 27, 37, 47, the routing path of the wire harness assembly can be ensured in the space in such a state that the wire harness assembly is most difficult to be affected by inertia. By doing so, the amount of extra or unnecessary movements of the wire harness assembly such as deflection due to vibrations of a vehicle or the like can be minimized.

Further, as it can be anticipated from the application of the invention to feeding an electric part on the windowpane, in a situation in which a very strong force (inertial force) is exerted on the wire harness assembly when the door is opened or closed, although there is a possibility that the wire harness assembly is brought into strong contact with peripheral parts, since the thin rod members 27, 37, 47 are thin and light, the effect imposed on the peripheral parts and the thin rod members can be minimized.

The invention is not limited to the embodiments that have been described heretofore but can be modified or improved as required. In addition, the materials, shapes, dimensions, numerical values, forms, numbers, routing positions and the like which are described in the embodiments can be determined arbitrarily as long as the invention can be attained, and the invention is not limited to them.

Spring steel materials and stainless steel materials are normally used for the thin rod members in consideration of spring properties, durability, corrosion resistance and the like. However, a material such as a glass fiber based epoxy resin may be used which has superior heat resistance and mechanical properties.

Further, the description of the embodiments is made of the wire harness routing structure 11 in which the wire harness assembly 13 extends between the door panel 3a of the rear door 3 and the windowpane 5. However, the wire harness routing structure may be applied to other types of the door such as a sliding door on the side in the vehicle. Further, the moving direction of the windowpane is not limited to ascending or descending direction (vertical direction), but may be lateral direction or oblique direction.

What is claimed is:

1. A wire harness routing structure comprising:
   a wire harness assembly including:
      an electric wire including:
         a fixed-side connecting portion to be fixed to a fixed structure;
         a movable-side connecting portion to be fixed to a movable structure which is movable with respect to the fixed structure; and
         an extension portion extended and flexed from along a length extending from the fixed-side connecting portion to the movable-side connecting portion in a substantially U-shape or arc shape, and having an extra length for allowing the movement of the movable structure;
      an elastic rod member which is provided along the extension portion of the electric wire and is detached from the fixed structure, wherein the elastic rod member is configured to control the movement of the electric wire; and
      an outer member fitted over the electric wire and the elastic rod member, provided along the extension portion of the electric wire and the elastic rod member,
   a first wire harness restricting member provided on the fixed structure; and
   a second wire harness restricting member provided on the movable- structure,
   wherein the first wire harness restricting member and the second wire harness restricting member restrict a widthwise movement of the wire harness assembly,
   wherein the first wire harness restricting member and the second wire harness restricting are only connected by the wire harness assembly.

2. The wire harness routing structure according to claim 1, wherein the rod member is made of a metallic material having a corrosion resistance.

3. The wire harness routing structure according to claim 1, wherein the rod member has rigidity larger than that of the electric wire.

4. The wire harness routing structure according to claim 1, wherein the rod member includes metallic wires twisted with each other.

5. The wire harness routing structure according to claim 4, wherein the twisted wires are coated with a resin material.

6. The wire harness routing structure according to claim 1, wherein the outer member is formed of a meshed structure and the elastic rod member disposed in the meshed structure follows the movement of the electric wire.

7. The wire harness routing structure according to claim 1, wherein the first wire harness restricting member has a width which increases from the fixed-side connecting portion towards a direction in which the electric wire extends.

8. The wire harness routing structure according to claim 1, wherein the second wire harness restricting member has a length which is shorter than a length of the wire harness assembly.

* * * * *